(12) United States Patent
Yamamoto

(10) Patent No.: US 10,922,031 B2
(45) Date of Patent: Feb. 16, 2021

(54) IMAGE FORMING APPARATUS THAT ADJUSTS A CYCLE OF A HORIZONTAL SYNCHRONIZATION SIGNAL IN ACCORDANCE WITH AN IMAGE WIDTH OF A PAGE IMAGE

(71) Applicant: KYOCERA Document Solutions Inc., Osaka (JP)

(72) Inventor: Takenori Yamamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/877,698

(22) Filed: May 19, 2020

(65) Prior Publication Data

US 2020/0371727 A1      Nov. 26, 2020

(30) Foreign Application Priority Data

May 23, 2019    (JP) .............................. JP2019-097186

(51) Int. Cl.
*G06F 3/12*      (2006.01)
(52) U.S. Cl.
CPC .......... *G06F 3/1215* (2013.01); *G06F 3/1254* (2013.01)

(58) Field of Classification Search
CPC ..... G06F 3/1215; G06F 3/1254; G03G 15/23; G03G 15/6564; G03G 21/14
See application file for complete search history.

(56) References Cited

U.S. PATENT DOCUMENTS

2008/0143757 A1\* 6/2008 Furihata ............... G09G 3/3406
345/102

FOREIGN PATENT DOCUMENTS

JP        2018-132596         8/2018

\* cited by examiner

*Primary Examiner* — Juan M Guillermety
(74) *Attorney, Agent, or Firm* — Lex IP Meister, PLLC

(57) ABSTRACT

An image forming apparatus includes a print engine to form a page image on a printing sheet, a sheet conveyance unit to convey the printing sheet to the print engine in a non-stop conveyance mode, a video board to supply image data of the page image to the print engine, and a controller board to execute predetermined image processing to generate the image data and transfer the image data to the video board. The video board transmits a horizontal synchronization signal to the controller board. The controller board transfers the image data to the video board line by line in synchronization with the horizontal synchronization signal. The video board adjusts a cycle of the horizontal synchronization signal in accordance with an image width of the page image to satisfy a print productivity condition set correspondingly to a size of the printing sheet.

5 Claims, 8 Drawing Sheets

FIG. 8

| SHEET SIZE | NUMBER OF LINES | IMAGE WIDTH [PIXELS] | PRODUCTIVITY CONDITION [ppm] | UPPER LIMIT PROCESSING TIME PER PAGE [msec] | HSYNC [msec] | IMAGE DATA TRANSFER TIME [msec] | MARGIN [msec] |
|---|---|---|---|---|---|---|---|
| 13x19 | 22800 | 15600 | 32 | 1875.00 | 64.60 | 1472.88 | 402.12 |
| 12x18 | 21600 | 14400 | 32 | 1875.00 | 59.84 | 1292.54 | 582.46 |
| A4-E | 9920 | 14028 | 85 | 705.88 | 58.25 | 577.84 | 128.04 |
| A4-R | 14028 | 9920 | 61 | 983.61 | 58.25 | 817.13 | 166.48 |
| LEDGER | 20400 | 13200 | 38 | 1578.95 | 58.25 | 1188.30 | 390.65 |
| B4 | 17196 | 12140 | 55 | 1090.91 | 58.25 | 1001.67 | 89.24 |
| B5-E | 8596 | 12140 | 85 | 705.88 | 58.25 | 500.72 | 205.17 |
| B5-R | 12140 | 8596 | 61 | 983.61 | 58.25 | 707.16 | 276.45 |
| A5 | 9920 | 6992 | 85 | 705.88 | 58.25 | 577.84 | 128.04 |
| A6 | 6992 | 9920 | 85 | 705.88 | 58.25 | 407.28 | 298.60 | ps
IMAGE FORMING APPARATUS THAT ADJUSTS A CYCLE OF A HORIZONTAL SYNCHRONIZATION SIGNAL IN ACCORDANCE WITH AN IMAGE WIDTH OF A PAGE IMAGE

INCORPORATION BY REFERENCE

This application is based upon and claims the benefit of priority from the corresponding Japanese Patent Application No. 2019-097186 filed on May 23, 2019, the entire contents of which are incorporated herein by reference.

BACKGROUND

The present disclosure relates to an image forming apparatus.

An image forming apparatus includes a controller board and an engine board, and the engine board controls a print engine to perform a printing process, and the controller board prepares image data to be supplied to the engine board, transfers the image data to the engine board, and controls the start of the printing process and the like.

Typically, the engine board stops a printing sheet at a resist position short of the print engine. When the controller board completes preparation of image data of an image to be printed on the printing sheet, the controller board transfers the image data to the engine board. The engine board starts conveyance of the printing sheet from the resist position to the print engine and controls the print engine to form an image by a color material (toner or ink) on the printing sheet.

On the other hand, in continuous printing for a plurality of printing sheets, there has been proposed a non-stop conveyance mode in which printing sheets are conveyed to the print engine on a predetermined fixed cycle without stopping at the resist position.

In the non-stop conveyance mode, it is necessary with respect to the image data of the page image to be printed on one printing sheet to transfer image data of a page image of one page from the controller board to the engine board in a time equal to or shorter than the upper limit processing time per page (60/N×1000 [msec]) derived from the print productivity condition (the number N of printed sheets per unit time [ppm]).

However, depending on the size of a printing sheet and the print resolution (namely, the number of pixels in the image width), the image data of the page image may not be transferred from the controller board to the engine board in time to satisfy the print productivity condition as required by the size.

SUMMARY

An image forming apparatus according to the present disclosure includes a print engine to form a page image on a printing sheet, a sheet conveyance unit to convey the printing sheet to the print engine in a non-stop conveyance mode, a video board to supply image data of the page image to the print engine, and a controller board to execute predetermined image processing to generate the image data and transfer the image data to the video board. The video board transmits a horizontal synchronization signal to the controller board. The controller board transfers the image data to the video board line by line in synchronization with the horizontal synchronization signal. The video board adjusts a cycle of the horizontal synchronization signal in accordance with an image width of the page image to satisfy a print productivity condition set correspondingly to a size of the printing sheet and indicating a number of printed sheets per unit time.

BRIEF DESCRIPTION OF THE DRAWINGS

FIG. 8 is another diagram illustrating an exemplary correspondence relationship between the size of a printing sheet and the cycle of a horizontal synchronization signal.

DETAILED DESCRIPTION

Hereinafter, an embodiment of the present disclosure will be described with reference to the drawings.

Figure 1:
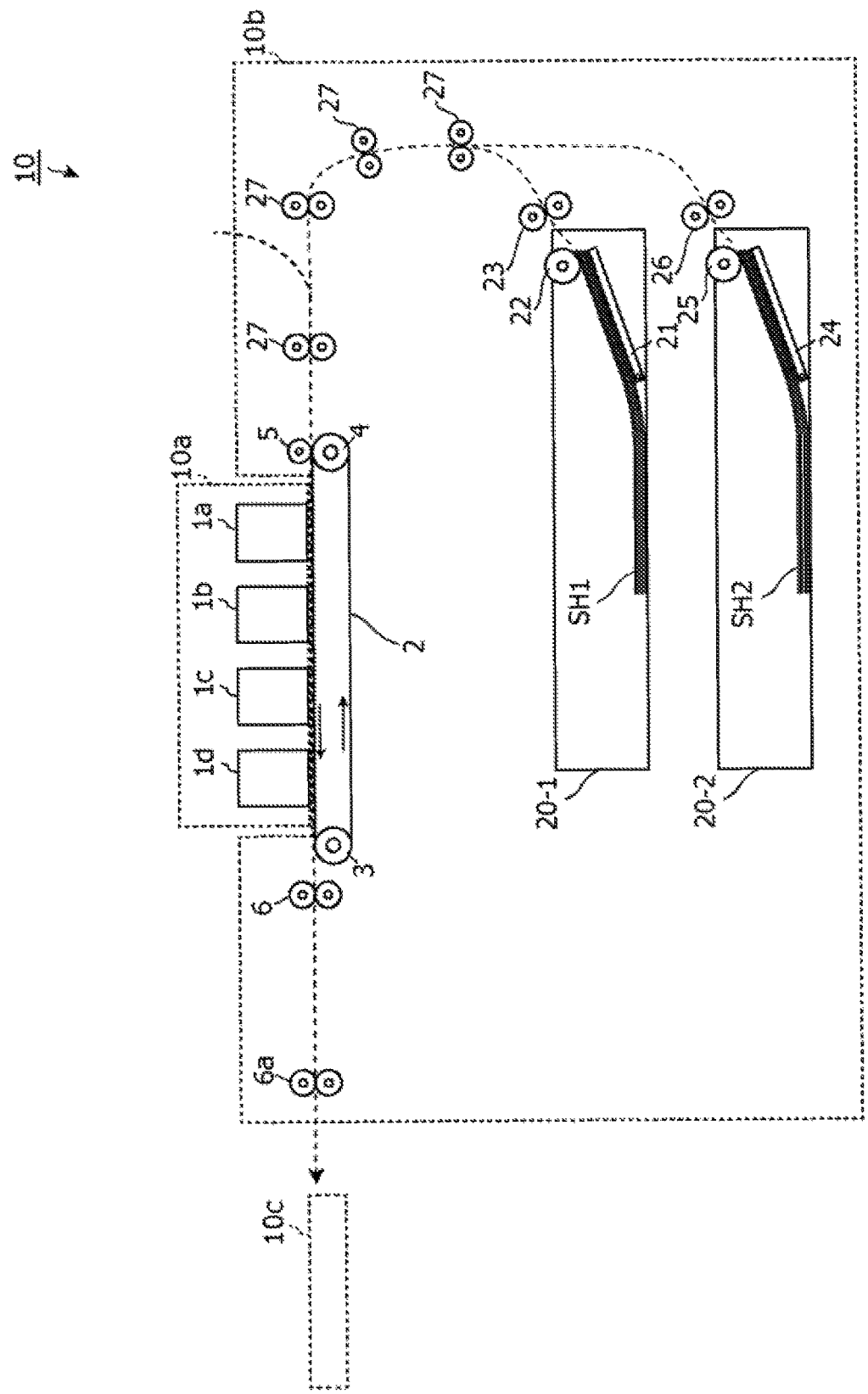
FIG. 1 is a side view for describing a mechanical internal configuration of an image forming apparatus according to an embodiment of the present disclosure.

FIG. 1 is a side view for describing a mechanical internal configuration of an image forming apparatus according to an embodiment of the present disclosure. An image forming apparatus 10 according to the present embodiment is such an apparatus as a printer, a copier, a facsimile machine, or a multifunction peripheral.

The image forming apparatus 10 illustrated in FIG. 1 includes a print engine 10a and a sheet conveyance unit 10b. The print engine 10a physically forms a page image to be printed on a printing sheet (such as a printing sheet of paper). In this embodiment, the print engine 10a is a line-type inkjet print engine. Note that the print engine 10a may be an electrophotographic print engine of an electrophotographic type.

In this embodiment, the print engine 10a includes line-type inkjet recording units 1a to 1d corresponding to four ink colors of cyan, magenta, yellow, and black. In the present embodiment, each of the inkjet recording units 1a, 1b, 1c, and 1d has one or more head units.

The sheet conveyance unit 10b conveys the printing sheet before printing to the print engine 10a along the predetermined conveyance path, and conveys the printing sheet after printing from the print engine 10a to the predetermined discharge destination.

The image forming apparatus 10 executes high-speed continuous printing by the sheet conveyance unit 10b of the non-stop conveyance mode. Therefore, the sheet conveyance unit 10b conveys the printing sheet to the print engine 10a by the non-stop conveyance mode. In this embodiment, the sheet conveyance unit 10b is not provided with a resist roller for stopping the printing sheet at the resist position.

In this embodiment, the sheet conveyance unit 10b includes an annular conveyance belt 2 that is disposed to face the print engine 10a and conveys the printing sheet, a drive roller 3 and a driven roller 4, on which the conveyance belt 2 is suspended, a suction roller 5 that nips the printing sheet together with the conveyance belt 2, and a pair of discharge rollers 6 and 6a.

The drive roller 3 and the driven roller 4 rotate the conveyance belt 2. Then, the suction roller 5 nips the printing sheets conveyed from a plurality of sheet feeding cassettes 20-1 and 20-2 described later, and the nipped printing sheets are sequentially conveyed to the print positions of the inkjet recording units 1a to 1d by the conveyance belt 2, and the images of the respective colors are printed by the inkjet recording units 1a to 1d. Then, the printing sheet after completion of the color printing is discharged to the discharge tray 10c or the like by the pair of discharge rollers 6 and 6a.

Further, the sheet conveyance unit 10b includes the sheet feeding cassettes 20-1 and 20-2. The sheet feeding cassettes 20-1 and 20-2 house printing sheets SH1 and SH2, push up the printing sheets SH1 and SH2 upward by lift plates 21 and 24, and bring the printing sheets SH1 and SH2 into contact with pickup rollers 22 and 25. The printing sheets SH1 and SH2 placed in the sheet feeding cassettes 20-1 and 20-2 are picked up by the pickup rollers 22 and 25 from the top one by one to sheet feeding rollers 23 and 26. The sheet feeding rollers 23 and 26 are rollers for conveying the sheets SH1 and SH2, which are fed by the pickup rollers 22 and 25 from the sheet feeding cassettes 20-1 and 20-2 to the conveyance path one by one, respectively. A conveyance roller 27 is a conveyance roller on the conveyance path, which is common to the printing sheets SH1 and SH2 conveyed from the sheet feeding cassettes 20-1 and 20-2.

Figure 2:
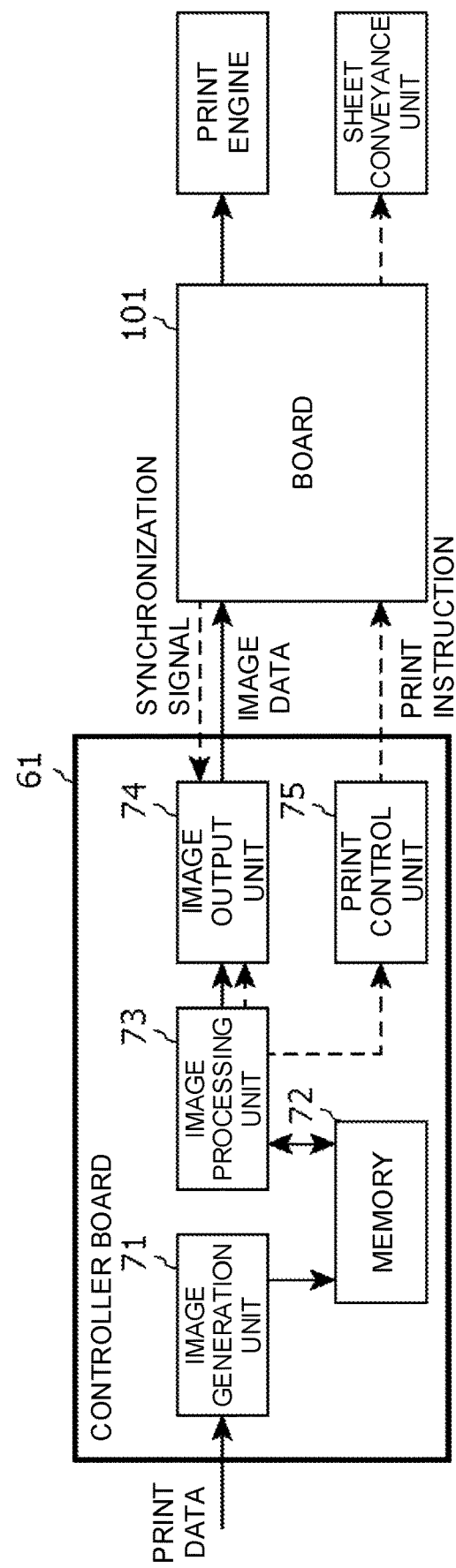
FIG. 2 is a block diagram illustrating a configuration of a controller board used in the image forming apparatus according to the embodiment of the present disclosure.

FIG. 2 is a block diagram illustrating a configuration of a controller board 61 used in the image forming apparatus 10 according to the embodiment of the present disclosure.

The controller board 61 does not have a non-stop conveyance function (namely, a function of managing the conveyance timing of the printing sheet in the non-stop conveyance mode). The controller board 61 includes an image generation unit 71, a memory 72, an image processing unit 73, an image output unit 74, and a print control unit 75. Specifically, the controller board 61 includes an arithmetic processing unit such as a computer that executes a predetermined program, an application specific integrated circuit (ASIC) that executes specific data processing, and the like, and the arithmetic processing unit functions as the image generation unit 71, the memory 72, the image processing unit 73, the image output unit 74, and the print control unit 75.

The image generation unit 71 generates raster image data of an image to be printed from the print data described in the page description language.

The memory 72 stores image data generated by the image generation unit 71, image data subjected to image processing performed by the image processing unit 73, and the like. Here, the memory 72 is a random access memory (RAM).

The image processing unit 73 performs predetermined image processing on the above-described image data. Specifically, the image processing unit 73 executes predetermined image processing such as an image rotation at 90°, 180°, or 270°, an image synthesis, color conversion, a color tone correction based on gamma curve, a halftoning, and a consumed toner reduction process (for example, thinning of characters or reduction in density), and the like.

The image output unit 74 transfers the image data after the image processing to a subsequent board 101 (board for controlling the print engine) according to a synchronization signal.

For example, upon detecting the arrival of the printing sheet at the resist position, the subsequent board 101 transmits a synchronization signal to the controller board 61, and the controller board 61 begins to transfer the image data in accordance with the synchronization signal. The subsequent board 101 does not have a page memory, and outputs the transferred image data to the print engine sequentially.

The print control unit 75 transmits a print instruction to the subsequent board 101 (board for controlling the print engine or the sheet conveyance unit).

As described above, in the image forming apparatus 10 according to this embodiment, the controller board 61 is used in the stop conveyance system, in which the printing sheet is temporarily stopped at the resist position short of the print engine.

Figure 3:
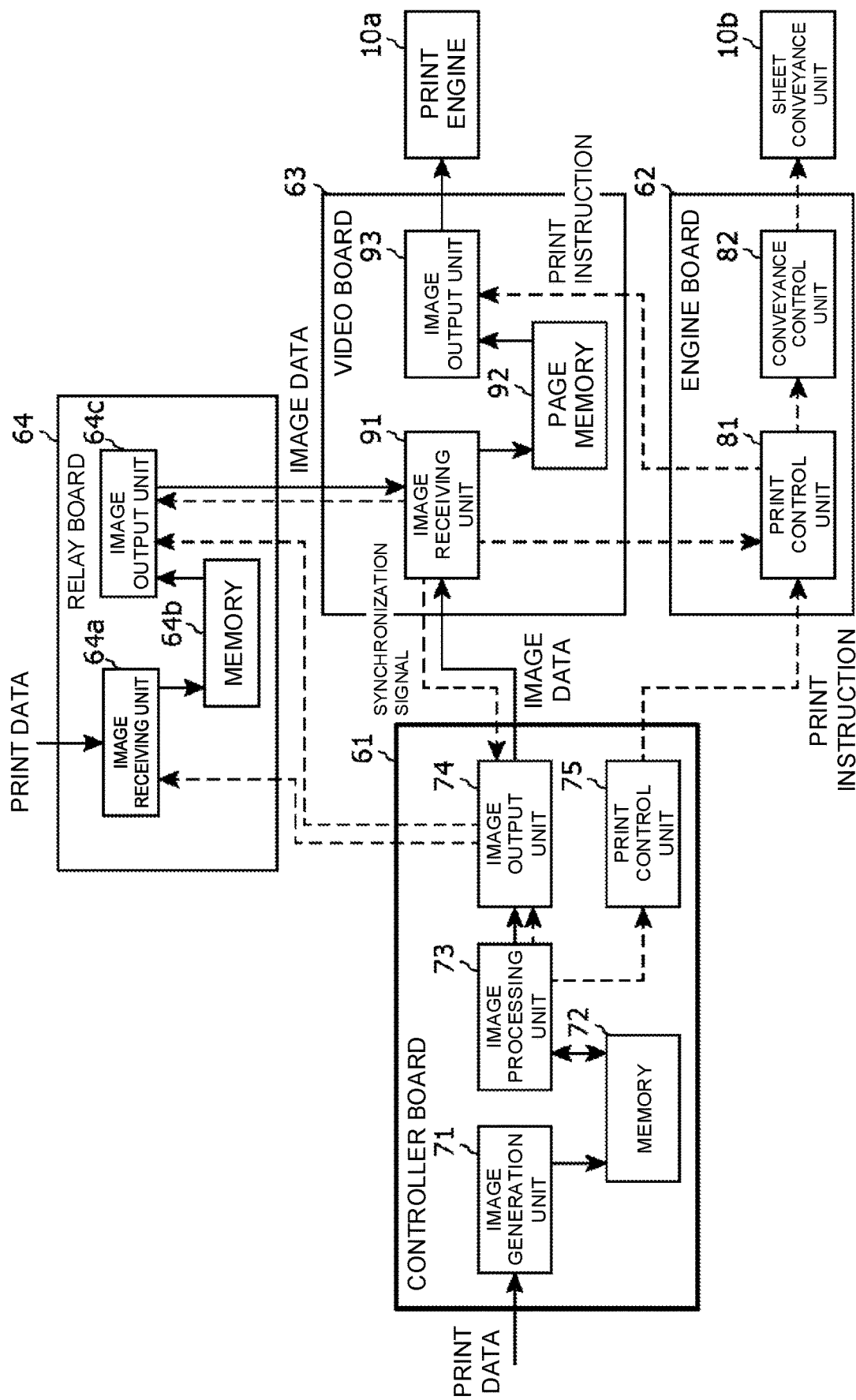
FIG. 3 is a block diagram illustrating an electrical configuration of the image forming apparatus according to the embodiment of the present disclosure.

FIG. 3 is a block diagram illustrating an electrical configuration of an image forming apparatus 10 according to an embodiment of the present disclosure. As shown in FIG. 3, the image forming apparatus 10 includes, in addition to the print engine 10a and the sheet conveyance unit 10b as illustrated in FIG. 1 and the controller board 61 as above, an engine board 62, a video board 63, and a relay board 64.

As described above, the controller board 61 performs predetermined image processing to generate image data of the page image. In the present embodiment, the controller board 61 transfers the image data of the page image to the video board 63.

The engine board 62 includes a print control unit 81 and a conveyance control unit 82. Specifically, the engine board 62 includes an arithmetic processing unit such as a computer that executes a predetermined program and an ASIC that executes specific data processing, and the arithmetic processing unit functions as the print control unit 81 and the conveyance control unit 82.

The print control unit 81 instructs the image output unit 93 of the video board 63 to output the image data of the page image to be output from the video board 63 to the print engine 10a.

The conveyance control unit 82 controls the sheet conveyance unit 10b. Specifically, the conveyance control unit 82 electrically controls drive devices (such as motors) of the drive roller 3, the driven roller 4, the suction roller 5, the pair of discharge rollers 6 and 6a, the sheet feeding rollers 23 and 26, the conveyance roller 27, and the like.

In particular, after the storage of the image data of the page image in a page memory 92 of the video board 63 is completed, the conveyance control unit 82 causes the sheet conveyance unit 10b to start the conveyance of the printing sheet on which the page image is to be printed.

The video board 63 supplies the image data of the page image to the print engine 10a. The video board 63 includes an image receiving unit 91, the page memory 92, and an image output unit 93. Specifically, the video board 63 includes an arithmetic processing unit such as a computer that executes a predetermined program and an ASIC that performs specific data processing, and the arithmetic processing unit functions as the image receiving unit 91 and the image output unit 93.

The image receiving unit 91 receives image data of a page image transferred from the controller board 61, and stores the received image data in the page memory 92. The page memory 92 temporarily stores image data of one or more page images. For example, the page memory 92 is a RAM.

In this embodiment, when the storage of the image data of the page image in the page memory 92 of the video board 63 is completed, the image receiving unit 91 transmits the ready signal (for the page image) to the print control unit 81 of the engine board 62. Note that, in the engine board 62, when the print control unit 81 receives the ready signal, the conveyance control unit 82 causes the sheet conveyance unit 10b to start conveyance of the printing sheet on which the page image is to be printed.

The image output unit 93 reads the image data of the page image to be printed from the page memory 92, and outputs the image data to the print engine 10a. The page image to be printed is designated by the print control unit 81 of the engine board 62.

Figure 4:
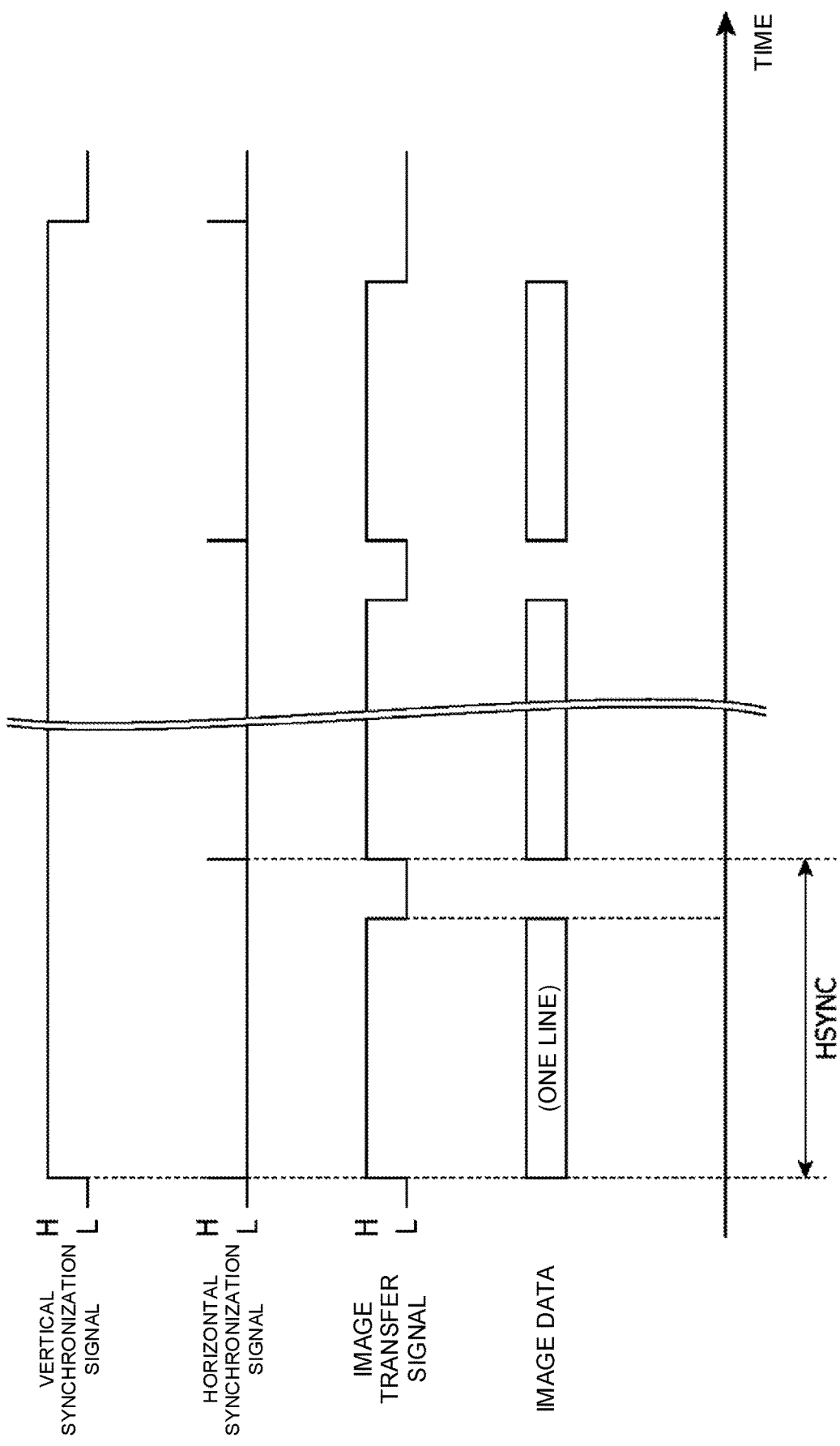
FIG. 4 is a timing chart for describing transfer of image data from the controller board to a video board in the image forming apparatus illustrated in FIGS. 1 and 3.

FIG. 4 is a timing chart illustrating transfer of image data from the controller board 61 to the video board 63 in the image forming apparatus 10 illustrated in FIGS. 1 and 3.

The image receiving unit 91 of the video board 63 transmits the vertical synchronization signal and the horizontal synchronization signal to the controller board 61, and the image output unit 74 of the controller board 61 starts transferring the image data of the page image of one page in synchronization with the vertical synchronization signal (at the rising edge of the vertical synchronization signal), and transfers the image data to the video board 63 line by line in synchronization with the horizontal synchronization signal, as shown in FIG. 4. More specifically, the image output unit 74 starts to transfer the image data for one line in synchronization with the horizontal synchronization signal, and asserts the image transfer signal only for the transfer period of the image data.

The image receiving unit 91 of the video board 63 adjusts a cycle HSYNC of the horizontal synchronization signal in accordance with the image width of the page image so as to satisfy the print productivity condition (the number of printed sheets per unit time) set correspondingly to the size of the printing sheet used for the printing.

Specifically, the image receiving unit 91 of the video board 63 adjusts the cycle HSYNC such that the cycle HSYNC of the horizontal synchronization signal is shorter as the image width of the page image is smaller.

In the present embodiment, the image receiving unit 91 of the video board 63 adjusts the cycle HSYNC to a value obtained by subtracting the decrement according to the image width from a predetermined upper limit value.

Here, the cycle HSYNC is specified according to the following equation.

$$HSYNC = NSYNC\_max \times Nsb/Nsb\_max$$

In the equation, NSYNC_max is a cycle NSYNC (fixed value) for a printing sheet having a maximum size (for example, 13×19 inches), Nsb_max is the number (fixed value) of subbands (blocks) in a main scanning direction for a printing sheet having a maximum size (for example, 13×19 inches), and Nsb is the number of subbands (blocks) in a main scanning direction for a printing sheet used for printing, with the number of subbands being an integer obtained by dividing the image width by the subband width (e.g., 128 pixels) and rounding up. Here, the subband is a block of 128×128 pixels. In addition, in this case, for a printing sheet having a maximum size (for example, 13×19 inches), NSYNC_max is set to 64.6 microseconds, and Nsb_max is set to 122.

Further, in this embodiment, when the cycle HSYNC of the horizontal synchronization signal is set according to the image width of the page image, the image receiving unit 91 of the video board 63 sets a predetermined lower limit value as the value of the cycle HSYNC of the horizontal synchronization signal if the cycle HSYNC is lower in value than the predetermined lower limit value. That is, the cycle HSYNC of the horizontal synchronization signal is clamped at the predetermined lower limit value.

The predetermined lower limit value is a value of HSYNC in the above-described equation that corresponds to a predetermined size of the printing sheet (size for which the numerical value of the print productivity condition is the largest, that is to say, the size of A4-E in this embodiment). In the above-described case (NSYNC_max=64.6 microseconds, Nsb_max=122), the predetermined lower limit value is 58.25 microseconds.

The upper limit value is set correspondingly to the maximum size of the printing sheet.

The relay board 64 receives print data (image data subjected to rasterizing and image processing) transferred from an external controller in an image receiving unit 64a, stores the received data in a memory 64b, reads the print data from the memory 64b by an image output unit 64c, and transfers the read data to the video board 63 in the same manner as the controller board 61.

Figure 5:
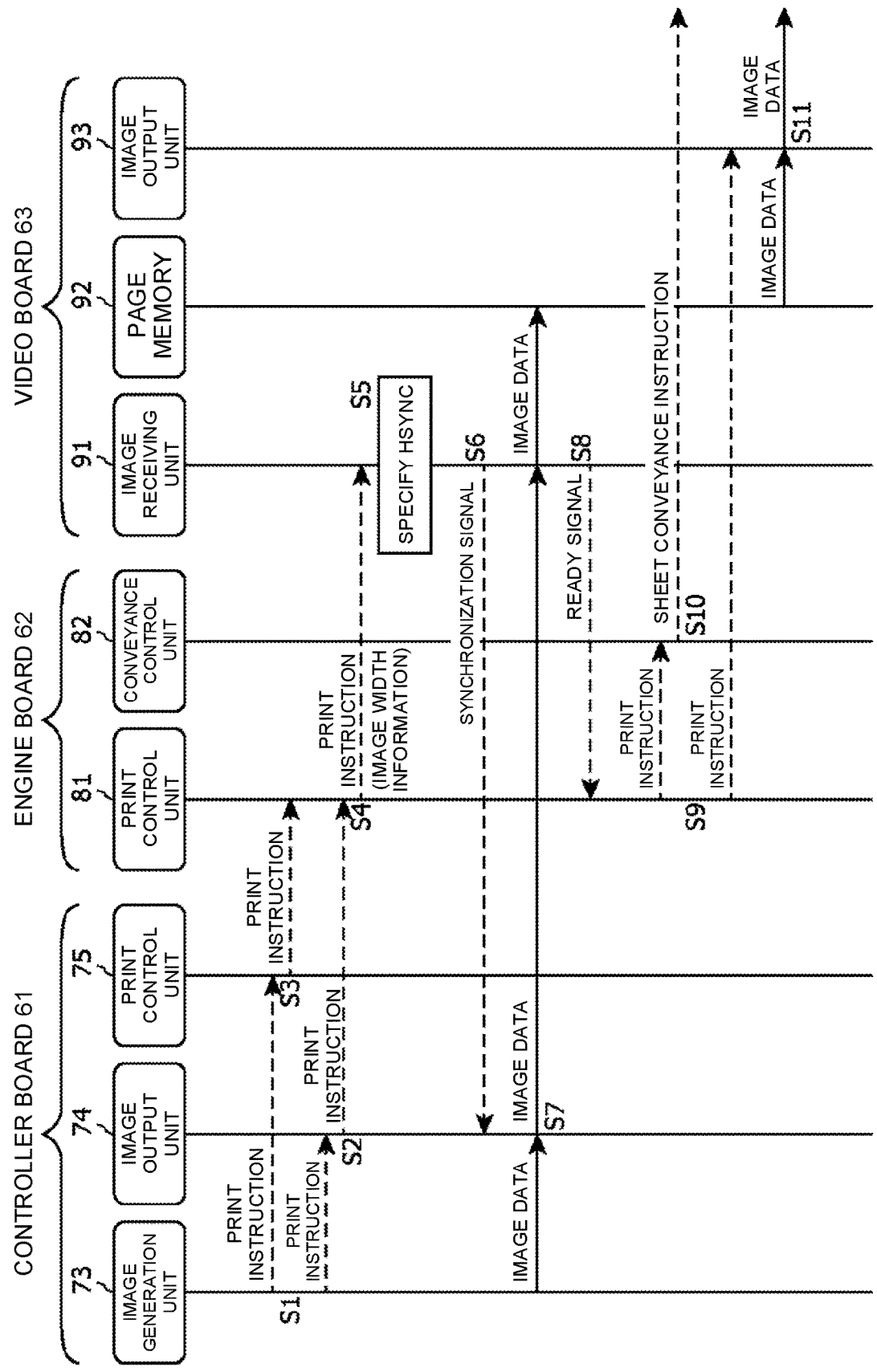
FIG. 5 is a sequence diagram for describing an operation of the image forming apparatus illustrated in FIGS. 1 and 3.

Next, the operation of the above-described image forming apparatus 10 will be described. FIG. 5 is a sequence diagram for describing the operation of the image forming apparatus 10 illustrated in FIGS. 1 and 3.

In the controller board 61, when the image generation unit 71 receives the print data from a host apparatus by using a communication apparatus (not illustrated), the image generation unit 71 sequentially generates the image data of the page image and stores the generated image data in the memory 72.

On the other hand, the image processing unit 73 reads the image data of the page image, and performs predetermined image processing on the image data. When the image processing is completed, the preparation of the image data of the page image is completed.

When the preparation of the image data of the page image to be printed is completed, the image processing unit 73 transmits a print instruction to the image output unit 74 and the print control unit 75 (step S1). Upon receiving the print instruction, the image output unit 74 transmits the print instruction to the image receiving unit 91 of the video board 63 (step S2).

The print control unit 75 of the controller board 61 transmits a print instruction to the print control unit 81 of the engine board 62 for each sheet (step S3). That is, when the preparation of the image data of the page image (page images for both surfaces in the case of double-sided printing) to be printed on the i-th sheet (i=1, . . . , N: N>0) in the print job is completed, the print control unit 75 of the controller board 61 transmits the print instruction of the i-th printing sheet to the print control unit 81 of the engine board 62.

Upon receiving the print instruction from the image output unit 74, the print control unit 81 of the engine board 62 transmits a print instruction including the image width information indicating the image width (the number of pixels in the main scanning direction) for the printing sheet to the image receiving unit 91 of the video board 63 (step S4).

Upon accepting the print instruction, the image receiving unit 91 specifies the cycle HSYNC of the horizontal synchronization signal that corresponds to the image width indicated by the image width information (step S5), transmits the vertical synchronization signal to the image output unit 74 of the controller board 61, and transmits the horizontal synchronization signal to the image output unit 74 of the controller board 61 repeatedly on the specified cycle HSYNC (step S6). The image output unit 74 of the controller board 61 transfers the image data of the page image in accordance with the synchronization signals (step S7). The image receiving unit 91 of the video board 63 receives the image data of the page image, and stores the received image data in the page memory 92.

Figure 6:
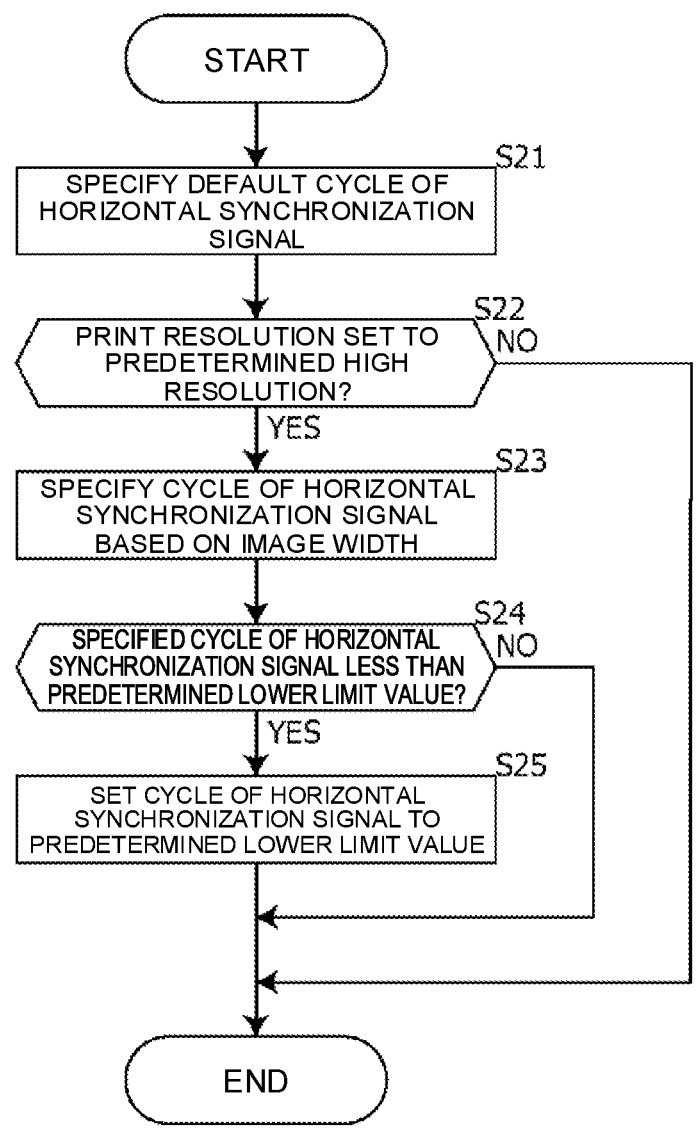
FIG. 6 is a flowchart illustrating an operation of an image receiving unit in the video board in FIG. 3.

FIG. 6 is a flowchart illustrating the operation of the image receiving unit 91 of the video board 63 in FIG. 3.

Upon accepting the above-described print instruction, the image receiving unit 91 first specifies a default cycle HSYNC of the horizontal synchronization signal (cycle HSYNC of the horizontal synchronization signal for a normal resolution (for example, 600 dpi)) (step S21), and then determines whether the print resolution is set to a predetermined high resolution (for example, 1200 dpi) (step S22).

When the print resolution is set to a predetermined high resolution, the image receiving unit 91 specifies the cycle HSYNC of the horizontal synchronization signal that corresponds to the image width designated by the print instruction, as described above (step S23).

The image receiving unit 91 determines whether the specified cycle HSYNC of the horizontal synchronization signal is less than the above-described predetermined lower limit value (step S24).

When the specified cycle HSYNC of the horizontal synchronization signal is less than the predetermined lower limit value, the image receiving unit 91 sets the cycle HSYNC of the horizontal synchronization signal to the predetermined lower limit value and transmits the horizontal synchronization signal repeatedly with the predetermined lower limit value as the cycle (step S25).

On the other hand, when the specified cycle HSYNC of the horizontal synchronization signal is equal to or larger than the predetermined lower limit value, the image receiving unit 91 repeatedly transmits the horizontal synchronization signal on the specified cycle HSYNC of the horizontal synchronization signal. In addition, when the print resolution is the normal resolution in step S22, the image receiving unit 91 repeatedly transmits the horizontal synchronization signal on the default cycle of the horizontal synchronization signal.

Figure 7:
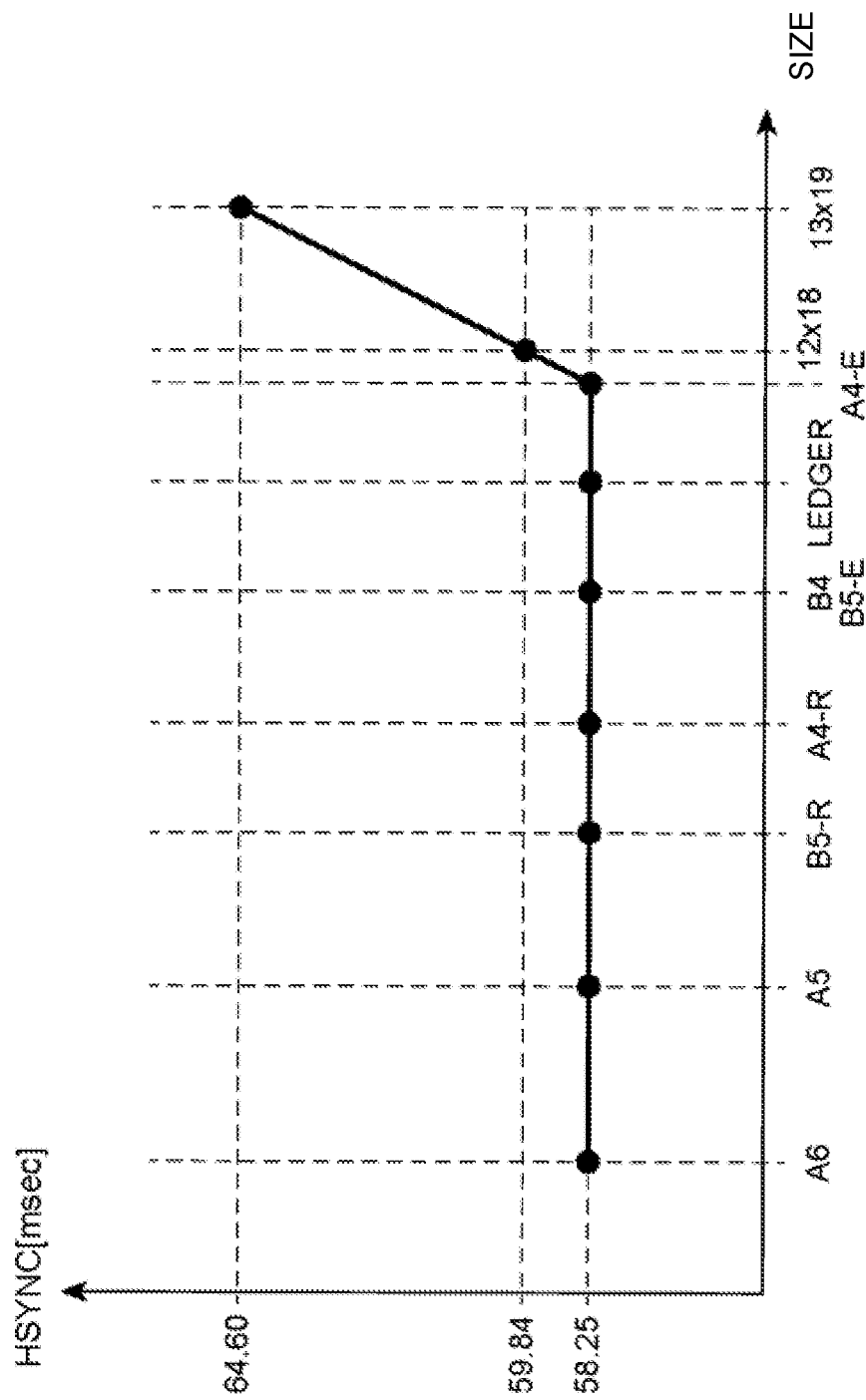
FIG. 7 is a diagram illustrating an exemplary correspondence relationship between the size of a printing sheet and the cycle of a horizontal synchronization signal.

FIGS. 7 and 8 are diagrams illustrating an example of a correspondence relationship between the size of a printing sheet and the cycle HSYNC of the horizontal synchronization signal. As shown in FIG. 7, the cycle HSYNC of the horizontal synchronization signal is set to the above-described predetermined lower limit value in terms of the printing sheets, for each of which the image width is equal to or less than the image width for a printing sheet of A4-E size. As shown in FIG. 8, the productivity condition is set in advance for each sheet size. From such productivity condition, the upper limit processing time per page is specified. Further, as described above, the cycle HSYNC described above is specified from the image width (the number of pixels in the main scanning direction) according to the sheet size, and the image data transfer time for one page is specified from the number of lines (the number of pixels in the sub-scanning direction) according to the sheet size and the cycle HSYNC. In FIG. 8, a margin as a difference between the upper limit processing time per page and the image data transfer time for one page is illustrated. As shown in FIG. 8, even the sheet size (B4 in FIG. 7), which allows the highest productivity condition in comparison with the data size, yields a sufficient margin, and the transfer of the image data from the controller board 61 to the video board 63 is adequately in time even in the continuous printing in the non-stop conveyance mode.

Returning to FIG. 5, when the storage of the image data of the page image in the page memory 92 is completed, the image receiving unit 91 transmits the ready signal to the print control unit 81 of the engine board 62 (step S8).

Upon receiving the ready signal for all the images to be printed on the i-th printing sheet, for which a print instruction has been accepted, the print control unit 81 of the engine board 62 transmits the print instruction to the conveyance control unit 82 and the image output unit 93 of the video board 63 (step S9), and the conveyance control unit 82 immediately transmits the sheet conveyance instruction for the i-th printing sheet to the sheet conveyance unit 10b upon receiving the print instruction (step S10).

The image output unit 93 reads the image data of the page image to be printed on the printing sheet from the page memory 92 in synchronization with the conveyance of the printing sheet, and outputs the image data to the print engine 10a (step S11).

Accordingly, the printing sheet is conveyed to the print engine 10a without stopping short of the print engine 10a, and the print engine 10a prints the page image on the printing sheet. Further, since the page memory 92 is provided, transfer of image data of a page image from the controller board 61 to the video board 63 can be performed asynchronously with the conveyance of the printing sheet. Therefore, even when the conveyance of the printing sheet is started after the completion of the storage of the image data of the page image in the page memory 92, the page image is prepared in the page memory 92 in time for the above-described fixed cycle by continuously executing the transfer of the image data of page images of a plurality of pages. Thereby, continuous printing in the non-stop conveyance mode is executed.

As described above, according to the above-described embodiment, the controller board 61 executes predetermined image processing to generate image data of a page image and transfer the image data to the video board 63. The video board 63 supplies the image data to the print engine 10a. The video board 63 transmits a horizontal synchronization signal to the controller board 61, and the controller board 61 transfers the image data of the page image to the video board 63 line by line in synchronization with the horizontal synchronization signal. Then, the video board 63 adjusts the cycle HSYNC of the horizontal synchronization signal in accordance with the image width of the page image so as to satisfy the print productivity condition set correspondingly to the size of the printing sheet and indicating the number of printed sheets per unit time.

Thus, the print productivity condition is satisfied, and the high-speed printing is performed in the non-stop conveyance mode.

It will be apparent to those skilled in the art that various changes and modifications to the above-described embodiment may be made. Such changes and modifications may be made without departing from the spirit and scope of the subject matter of the embodiment and without diminishing the intended advantages. That is, it is intended that such changes and modifications be incorporated in the claims.

What is claimed is:

1. An image forming apparatus comprising:
a print engine that forms a page image on a printing sheet;
a sheet conveyance unit that conveys the printing sheet to the print engine in a non-stop conveyance mode;
a video board that supplies image data of the page image to the print engine; and a controller board that executes predetermined image processing to generate the image data and transfer the image data to the video board, wherein the video board transmits a horizontal synchronization signal to the controller board, wherein the controller board transfers the image data to the video board line by line in synchronization with the horizontal synchronization signal, and wherein the video board adjusts a cycle of the horizontal synchronization signal in accordance with an image width of the page image to satisfy a print productivity condition set correspondingly to a size of the printing sheet and indicating a number of printed sheets per unit time.

2. The image forming apparatus according to claim 1, wherein the video board adjusts the cycle of the horizontal synchronization signal to make the cycle shorter as the image width of the page image is smaller.

3. The image forming apparatus according to claim 1, wherein the video board adjusts the cycle to a value obtained by subtracting a decrement according to the image width from a predetermined upper limit value.

4. The image forming apparatus according to claim 3, wherein the video board sets a predetermined lower limit value as a value of the cycle of the horizontal synchronization signal when the cycle of the horizontal synchronization signal is set according to the image width of the page image and the cycle is lower in value than the predetermined lower limit value.

5. The image forming apparatus according to claim 3, wherein the predetermined upper limit value is set correspondingly to a maximum size of the printing sheet.

* * * * *